UNITED STATES PATENT OFFICE.

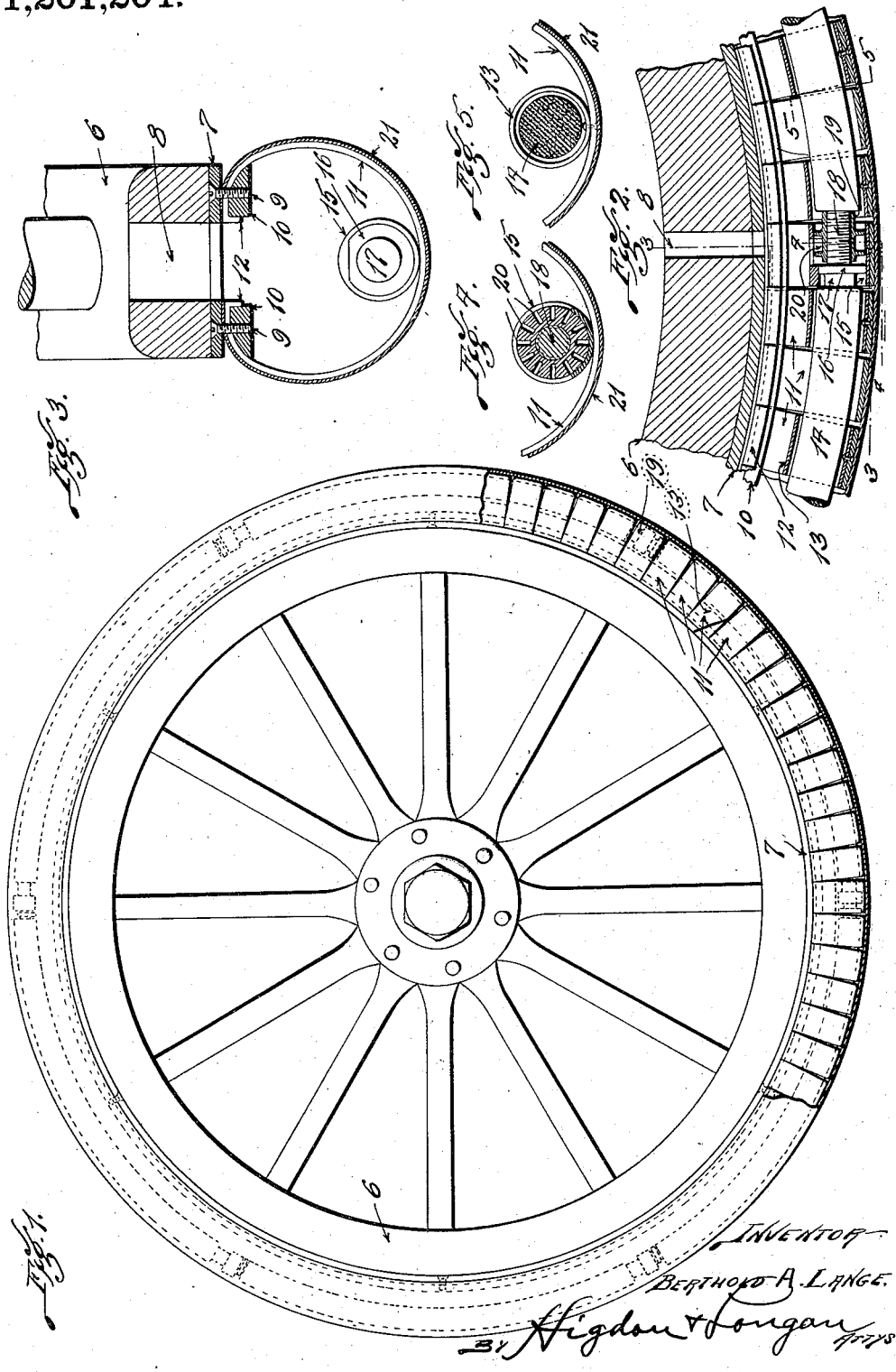

BERTHOLD A. LANGE, OF WEBSTER GROVES, MISSOURI.

TIRE.

1,201,204.

Specification of Letters Patent.

Patented Oct. 10, 1916.

Application filed December 20, 1915. Serial No. 67,777.

*To all whom it may concern:*

Be it known that I, BERTHOLD A. LANGE, a citizen of the United States, and resident of Webster Groves, Missouri, have invented certain new and useful Improvements in Tires, of which the following is a specification containing a full, clear, and exact description, reference being had to the accompanying drawings, forming a part hereof.

My invention relates to improvements in tires and the object of my invention is to construct a tire which may be readily attached to wheels, which tire will be provided with a continuous unbroken and resilient tread, having mechanical cushion devices whose tension or resiliency may be varied as required for different vehicles and road conditions.

With the above object in view my invention consists in certain details of construction and arrangement of parts hereinafter fully set forth, pointed out in my claims, and illustrated by the accompanying drawing in which;

Figure 1 shows a wheel provided with a tire constructed according to my invention; Fig. 2 is a fragmental longitudinal sectional elevation showing a portion of the felly, its rim, a section of my improved tire, a number of resilient elements of the tire and the means for varying the tension or resiliency of said elements; Fig. 3 is an enlarged transverse sectional view of the tire taken on the line 3—3 of Fig. 2; Fig. 4 is a transverse sectional elevation taken on the line 4—4 of Fig. 2, and Fig. 5 is a transverse sectional elevation taken on the line 5—5 of Fig. 2.

Referring by numerals to the accompanying drawing, 6 designates the felly and 7 the rim, of an ordinary wooden wheel. This wheel with its wooden felly and rim is of the common construction except for the openings 8 whose purpose will be made clear hereinafter. At intervals circumferentially, the rim 7 is provided with axially alining pairs of perforations whereby to receive the screws 9, which screws secure to the rim the rings 10, which rings serve to secure to the rim 7 the metallic resilient leaves or springs 11. Each of the springs 11 has at each terminal a hook 12 for engagement over the rings 10 to hold them in place on the rim. Within certain of the springs 11, preferably each alternate spring as shown in Fig. 2, I mount and secure by rivets or the like, a sleeve 13 and through these sleeves I extend sectional elastic bodies 14.

At intervals circumferentially of the tire corresponding in number to the openings 8 in the felly and rim and to the number of the elastic bodies 14, I mount the sleeves 15 whose inner perimeters are non-circular as shown in Fig. 3 for portions of their lengths only and in this non-circular portion of each sleeve 15 I mount a plate 16 which will be free to move lengthwise of the sleeve, and having the same contour as the inner perimeter of the sleeve it will be prevented from rotating therein. The plate 16 carries at its one side a boss 17 arranged to impinge the adjacent end of the elastic body 14, while the opposite face of the plate 16 carries a threaded stem 18. Threaded to this stem 18 is a sleeve 19 having in its periphery a number of sockets 20, into which a tool may be introduced for the rotation of the threaded sleeve. This threaded sleeve is arranged to impinge the elastic body 14 opposite the elastic body 14 engaged by the boss 17 and by rotating the sleeve 19 it will be obvious that the tension on the elastic bodies 14 may be varied. In order to provide a continuous unbroken tread surface I secure over all of the springs 11 a casing 21 which is held in place by the screws 9 and is located between the ends of the metallic springs 11 and the metallic rim 7.

While I have shown the elastic bodies 14 as being made of some solid material having in mind rubber, I do not wish to be understood as limiting myself to such a structure as a helical spring is within the scope of my invention and I consider the helical spring to be the full mechanical equivalent of the solid rubber body shown.

While I have shown the elastic bodies as being extended through sleeves I do not wish to be understood as limiting myself to such a structure, and contemplate the use of such sleeves only in wheels of great size and where extra tension is necessary, and in which instance such sleeves are designed to prevent buckling of the elastic body.

Having thus described my invention, what I claim as new therein and desire to secure by Letters Patent of the United States, therefore is:

1. A tire comprising a plurality of leaf springs and means for securing them in transverse arrangement to the periphery of a wheel, sleeves fixedly secured to certain of said leaf springs, a body including adjusting means extended through said sleeves and arranged to exert outward pressure upon said leaf springs, said adjusting means arranged for a variation of the length of said body to vary the tension of said leaf springs.

2. A tire comprising a plurality of leaf springs and means for securing them in transverse arrangement to the periphery of a wheel, sleeves fixedly secured to certain of said leaf springs, a body including adjusting means extended through said sleeves and arranged to exert outward pressure upon said leaf springs, the adjusting means of said body arranged for a variation of its length to vary the tension of said leaf springs, and a casing for said leaf springs, said sleeves, said body and the adjusting means for said body.

3. In combination with a rim, a plurality of leaf springs a pair of rings for securing said springs to said rim, sleeves arranged within and secured to certain of said leaf springs, a sectional elastic body extended through said sleeves, a number of adjustable means impinging the ends of said bodies whereby to vary the tensions of said leaf springs, and a casing for said leaf springs.

4. A tire comprising a plurality of leaf springs means for securing them in transverse arrangement to the periphery of a wheel, sleeves secured to certain of said leaf springs, and a body having an inherent elastic quality arranged within said sleeves and to bear outwardly thereagainst.

In testimony whereof, I have signed my name to this specification, in presence of two subscribing witnesses.

BERTHOLD A. LANGE.

Witnesses:
R. G. ORWIG,
A. C. KIBURTZ.

Copies of this patent may be obtained for five cents each, by addressing the "Commissioner of Patents, Washington, D. C."